US012277152B2

(12) United States Patent
Terry et al.

(10) Patent No.: US 12,277,152 B2
(45) Date of Patent: Apr. 15, 2025

(54) SYSTEM AND METHOD FOR SERIAL-OVER-IP SWITCH BASED CHARACTER STRING PATTERN MATCHING AND DETECTION

(71) Applicant: VERTIV IT SYSTEMS, INC., Huntsville, AL (US)

(72) Inventors: Luke Terry, Round Rock, TX (US); Joerg Weedemann, Santa Clara, CA (US); Joseph Amirthasamy, Weston, FL (US)

(73) Assignee: VERTIV CORPORATION, Westerville, OH (US)

( * ) Notice: Subject to any disclaimer, the term of this patent is extended or adjusted under 35 U.S.C. 154(b) by 0 days.

(21) Appl. No.: 18/336,325

(22) Filed: Jun. 16, 2023

(65) Prior Publication Data

US 2023/0418854 A1 Dec. 28, 2023

Related U.S. Application Data

(60) Provisional application No. 63/354,937, filed on Jun. 23, 2022.

(51) Int. Cl.
*G06F 16/33* (2025.01)
*G06F 13/38* (2006.01)
*G06F 16/3332* (2025.01)

(52) U.S. Cl.
CPC ........ *G06F 16/3334* (2019.01); *G06F 13/385* (2013.01)

(58) Field of Classification Search
CPC .................................................. G06F 16/3334
See application file for complete search history.

(56) References Cited

U.S. PATENT DOCUMENTS 6,178,270 B1  1/2001  Taylor et al.
6,204,842 B1  3/2001  Fujii
6,587,586 B1  7/2003  Cui et al.
(Continued)

FOREIGN PATENT DOCUMENTS

TW    201933179 A    8/2019

OTHER PUBLICATIONS

Extended European Search Report for corresponding European Patent Application No. 2318097.6 mailed Nov. 6, 2023, 8 pages.
(Continued)

*Primary Examiner* — Mohammad S Rostami
(74) *Attorney, Agent, or Firm* — HARNESS, DICKEY & PIERCE, P.L.C.

(57) ABSTRACT

The present disclosure relates to a system for detecting a user defined character string in serial data at least one of output from a target device or transmitted to a target device. The system makes use of a serial communications device configured to enable a user to conduct a serial-over-IP active serial session with the target device. The serial communications device has a pattern matching application configured to at least one of receive, or be programmed with, a user defined character string, and to monitor for an occurrence of the user defined character string in serial data at least one of received from the target device or transmitted to the target device. The pattern matching application also is configured to take a predetermined action upon the detection of the user defined character string.

18 Claims, 4 Drawing Sheets

(56) References Cited

U.S. PATENT DOCUMENTS

| | | |
|---|---|---|
| 7,609,889 B2 | 10/2009 | Guo et al. |
| 8,103,099 B2 | 1/2012 | Andel et al. |
| 8,489,624 B2 | 7/2013 | King et al. |
| 8,515,185 B2 | 8/2013 | Lee et al. |
| 9,231,921 B2 | 1/2016 | Raskin et al. |
| 9,241,134 B2 | 1/2016 | Candelore |
| 9,282,072 B1 * | 3/2016 | Tung .................... G06F 13/385 |
| 9,400,727 B2 | 7/2016 | Barak et al. |
| 9,843,619 B2 | 12/2017 | Siegman et al. |
| 9,883,035 B1 | 1/2018 | Kulkarni et al. |
| 9,886,426 B1 * | 2/2018 | Taylor .................. G06F 40/109 |
| 10,091,239 B2 | 10/2018 | Ylonen et al. |
| 11,017,254 B2 | 5/2021 | Peng et al. |
| 12,147,601 B1 * | 11/2024 | Laufer ................... A61B 5/394 |
| 12,151,530 B1 * | 11/2024 | Cunningham ..... B60G 17/0162 |
| 2002/0029259 A1 | 3/2002 | Okada |
| 2003/0221013 A1 | 11/2003 | Lockwood et al. |
| 2006/0095504 A1 | 5/2006 | Gelsey |
| 2009/0009532 A1 | 1/2009 | Hallberg |
| 2011/0225485 A1 * | 9/2011 | Schnitt .................. G06F 40/174 715/224 |
| 2012/0017262 A1 | 1/2012 | Kapoor et al. |
| 2013/0307970 A1 | 11/2013 | Barak et al. |
| 2014/0164444 A1 * | 6/2014 | Bowen .................... G06F 16/11 707/821 |
| 2014/0172885 A1 * | 6/2014 | Sekharan ............... G06F 16/958 707/755 |
| 2015/0121268 A1 | 4/2015 | No et al. |
| 2015/0242537 A1 * | 8/2015 | Takeuchi ............ G06F 16/2465 707/776 |
| 2016/0132046 A1 * | 5/2016 | Beoughter ............ G06F 16/248 700/17 |
| 2017/0235735 A1 * | 8/2017 | Ignatyev ................ G06Q 10/00 706/12 |
| 2019/0020554 A1 * | 1/2019 | Lilienthal ............... H04L 41/22 |
| 2019/0027149 A1 * | 1/2019 | Vogel .................... G16H 15/00 |
| 2019/0228252 A1 | 7/2019 | Peng et al. |
| 2020/0213159 A1 | 7/2020 | Wilson et al. |
| 2020/0293459 A1 | 9/2020 | Gnanasambandam et al. |
| 2021/0397598 A1 * | 12/2021 | Fukumoto ............ G06F 16/254 |
| 2022/0027418 A1 * | 1/2022 | Gupta ................... G06F 16/906 |
| 2022/0413817 A1 * | 12/2022 | Kielstra ................... G06F 8/443 |
| 2023/0409558 A1 * | 12/2023 | Wysocki ............. G06F 16/2379 |

OTHER PUBLICATIONS

Extended European Search Report in corresponding EP application No. 23 180 680.3 dated Dec. 3, 2024, 8 pages.

* cited by examiner

SYSTEM AND METHOD FOR SERIAL-OVER-IP SWITCH BASED CHARACTER STRING PATTERN MATCHING AND DETECTION

CROSS-REFERENCE TO RELATED APPLICATIONS

This application claims the benefit of priority under 35 U.S.C. § 119(e) to U.S. Provisional Application No. 63/354, 937, filed on Jun. 23, 2022. The entire disclosure of the above application is incorporated herein by reference.

FIELD

The present disclosure relates to serial switch systems and methods, and more particularly to a system making use of a serial-over-IP switch, commonly referred to as a serial appliance, and alphanumeric pattern matching, to detect an occurrence of one or more predetermined alphanumeric character strings in serial data being transmitted between a target serial device and a serial appliance during an active serial session, and to enable a predetermined action to be taken upon the detected occurrence of the predetermined alphanumeric character string.

BACKGROUND

The statements in this section merely provide background information related to the present disclosure and may not constitute prior art.

A serial-over-IP switch, which is commonly referred to as a "serial appliance", is frequently used in data center environments to enable a remotely located user to access and establish a connection with a target serial device in the data center via an IP network connection. The serial appliance allows the user to remotely connect his/her client computer to the serial port of the target device via the serial appliance. In this manner a serial data stream, typically text, can be transmitted from the client computer to the serial port of the target device. Without the serial appliance, the user would otherwise need to be physically next to the target device to be able to connect the client computer directly to the serial port of the target device using a serial cable.

If the user has an active connection from his/her client computer through the IP network to the serial appliance, and the serial appliance is connected to the serial port of the target device so that serial data can be transmitted from the client device to the serial appliance and vice versa, then this is referred to as an "active serial session" with respect to that target device. This serial connectivity via a serial appliance over an IP network has many helpful use cases, including configuration and management of target devices by IT administrators, remotely troubleshooting issues on target devices, and deployment of new target devices.

Typically, the target devices all utilize the same type of text data over the serial interface; however, the text commands used to manage, configure, troubleshoot and deploy target devices are typically unique to each target device model and/or manufacturer. This becomes important when one recognizes that modern day data centers may have hundreds, or even thousands, of serial devices that IT administrators need to be able to connect to via a serial appliance at any given time. Any operation and process that requires manual intervention by an IT administrator, that is, manually connecting a client computer to the serial port of a specific target device via a separate serial cable, is highly inconvenient and time consuming. Accordingly, any system and/or feature that offers the ability to automate known actions (e.g., configuration, troubleshooting, deployment) when accessing the serial port of a target device will be valuable and extremely helpful to IT professionals. Likewise, device error events that lead to down-time can be catastrophic, and any feature that offers immediate alerting of the error event or automatic recovery would be highly valuable to IT professionals.

Accordingly, a system and method that enables a client computer, when carrying out an active serial session with a serial appliance, to define a specific alphanumeric character string (i.e., a string of text characters only, or any combination of text characters and/or numbers and/or symbols), and then to search for that specific predetermined character string in text that is received from the target device via the serial appliance, would add significantly to the ease and convenience in configuring, and/or troubleshooting and/or deploying target devices by IT professionals.

SUMMARY

This section provides a general summary of the disclosure and is not a comprehensive disclosure of its full scope or all of its features.

In one aspect the present disclosure relates to a system for detecting a user defined character string in serial data being at least one of transmitted to a target device or received from the target device. The system may comprise a serial communications device able to be at least one of operated by or accessed by a user to carry out a serial-over-IP active serial session with the target device. The serial communications device may include a pattern matching application configured to at least one of receive, or be programmed with, a user defined character string, and to monitor for an occurrence of the user defined character string in serial data being at least one of transmitted to the target device or received from the target device, and upon detection of the user defined character in the serial data, to take a predetermined action.

In another aspect the present disclosure relates to a system for detecting a user defined character string in serial data being received from a target device during a serial-over-IP active serial session. The system may comprise a serial-over-IP serial appliance configurable for communication with the target device via a serial connection. The serial-over-IP serial appliance may include a processor, a memory, and a pattern matching application stored in the memory. The pattern matching application is configured to perform several operations: to enable a user to input a user defined character string via an external user computing device; to monitor for the presence of the user defined character string in serial data at least one of received from the target device or transmitted to the target device; and to take a predetermined action upon detection of the user defined character string in the serial data.

In still another aspect the present disclosure relates to a method for detecting a user defined character string in serial data at least one of received from a target device during a serial-over-IP active serial session, or transmitted to the target device during the serial-over-IP active serial session. The method may comprise using a pattern matching application to monitor serial data at least one of received from the target device by a serial communications device, or transmitted to the target device from the serial communications device, during the serial-over-IP active serial session. The method may also include comparing a user defined character string operably associated with the pattern matching application to serial data at least one of received by the serial communications device, or transmitted from the serial communications device, to determine if the user defined character string is present in the serial data. When serial data which is either received by the serial communications device or transmitted from the serial communications device to the target device, is detected that matches the user defined character string, then a predetermined action is taken.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations or embodiments and are not intended to limit the scope of the present disclosure.

Corresponding reference numerals indicate corresponding parts throughout the several views of the drawings, wherein.

DETAILED DESCRIPTION

Figure 1:
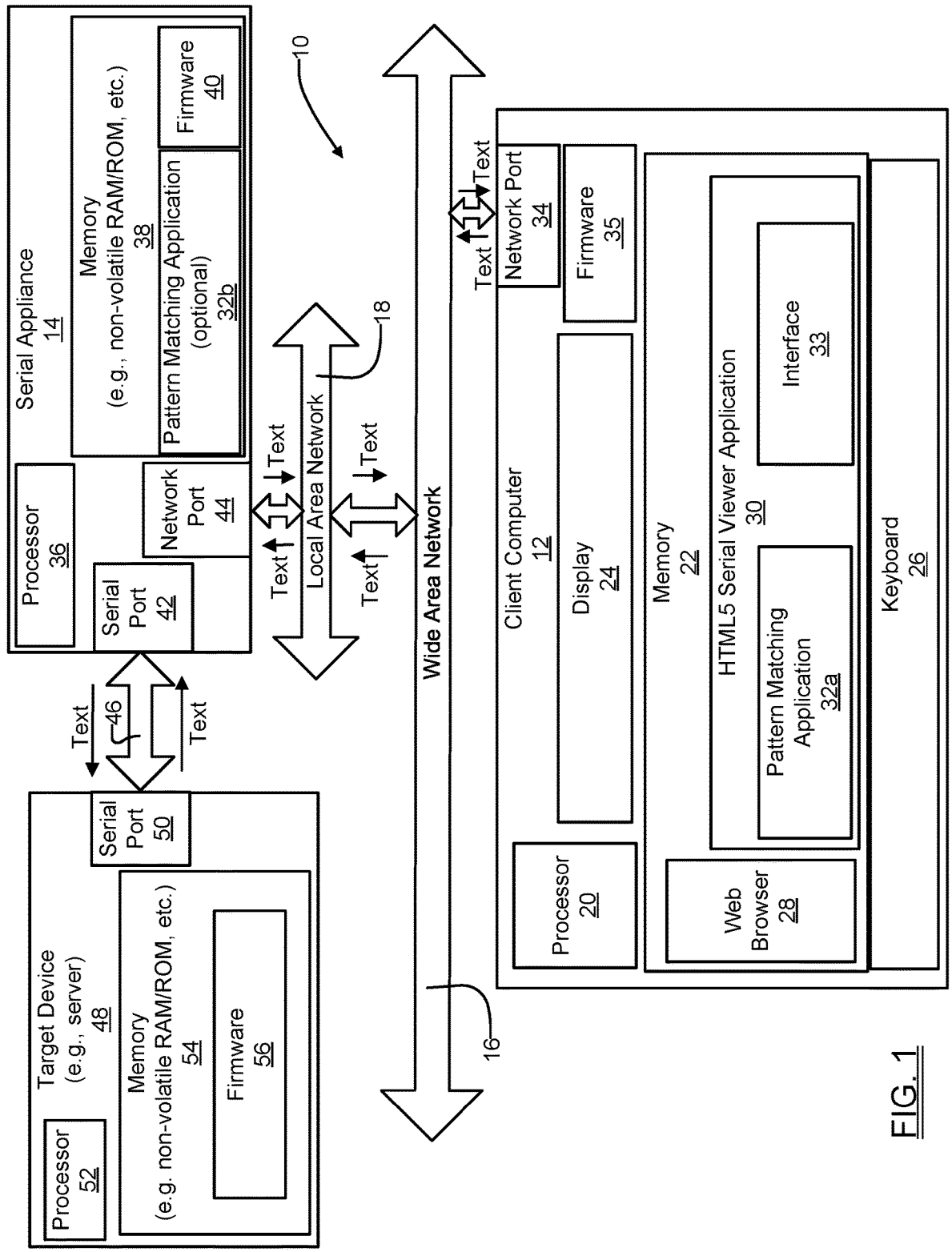
FIG. 1 is a high level block diagram showing several different embodiments of systems in accordance with the present disclosure for a serial-over-IP switch having a pattern matching and detection subsystem for detecting user-defined character strings in text being transmitted to the serial-over-IP switch.

Example embodiments will now be described more fully with reference to the accompanying drawings.

The present disclosure relates to a system and method involving the use of a pattern matching application in at least three different ways: first, where the pattern matching application is implemented only on a user's client computing device in connection with a serial viewer application, or second, where the pattern matching application is implemented directly (i.e., only) on a serial-over-IP switch, such as in memory (e.g., firmware) of the serial-over-IP switch, or third, where the pattern matching application is located on both the user's client computing device and the serial-over-IP switch.

A system 10 in accordance with the present disclosure will now be described in connection with FIG. 1. It will be appreciated immediately that FIG. 1 will be used to illustrate all three of the distinct embodiments described. In the first embodiment the system 10 incorporates the pattern matching logic in a user's client computing device. In this example a serial communications device in the form of a client computing device 12 (e.g., laptop, desktop, computing tablet, smartphone, or other personal electronic device) is in communication with a serial-over-IP switch 14, which is also known as a "serial appliance" (hereinafter simply "serial appliance 14") via a wide area network 16 and a local area network 18. However, it will be appreciated that the present disclosure is not limited to any specific type of network connection, but in most applications at least a local area network connection will be used, and in many applications the client device 12 will be connecting to the serial appliance 14 via both a wide area network and one or more local area networks.

The client computing device 12 (hereinafter simply "client computer 12") in one example may include a processor 20, a memory 22 (e.g., non-volatile RAM/ROM, etc.) accessible by the processor, a display 24 and a keyboard 26. As will be appreciated, the keyboard 26 and display 24 may be formed by external components coupled to the client computer by separate cables (e.g., via USB and/or video cables), such as when a desktop computer is being used as the client computer 12 and an external keyboard and external mouse are coupled to the desktop. For the following discussion it will be assumed that the display 24 and the keyboard 26 are part of the client computer 12. In either of these applications, the user may establish a serial data stream to/from the client computer 12, and to/from the serial appliance 14.

The memory 22 may store a web browser application 28, a serial viewer application, for example and without limitation, an HTML5 serial viewer application 30. In the first embodiment, a pattern matching application 32a is included in the HTML5 serial viewer application 30 along with a user interface 33. The user interface 33 may be a graphical user interface which enables a user to input a user defined character string, as well as to define specific actions to be taken when the user defined character string is detected in serial data received by the client computer 12, which will be discussed in greater detail in the following paragraphs. A network communications port 34 (e.g., Ethernet port) may be included which enables the client computer 12 to communicate with the serial appliance 14 over a network connection. The memory 22 also includes firmware 35 for assisting in carrying out the operation of the client computer 12.

The serial appliance 14 forms a serial communications device and may include its own processor 36, a memory 38 (e.g., non-volatile RAM/ROM, etc.) for storing firmware 40 for assisting in controlling operation of the serial appliance, and at least one serial port 42 for bi-directional communication of serial data, and a network port 44. The serial port 42 is used for communicating via a serial cable 46 with a remote target device 48. More typically, the serial appliance 14 will contain a plurality of serial ports (typically 4, 8, 16, 32, etc.). The network port 44 (e.g., Ethernet port) is used for establishing a network connection via the local area network 18 and the wide area network 16 with the client computer 12.

The target device 48 may be any form of device capable of providing a serial output. Typical target devices are network switches and "smart" devices such as embedded devices running small Linux-style operating systems, computers, IoT devices, smart cameras, rack PDUs (Power Distribution Units), or even servers. Thus, the target device 48 may be formed by virtually any device having a serial port which is capable of transmitting/receiving serial data. The target device 48, which does not form part of the system 10, typically includes at least one serial port 50 for enabling a direct serial connection via the serial cable 46 with the serial appliance 14. Typically, the target device 48 also includes a processor 52, memory 54 (e.g., non-volatile RAM/ROM, etc.) and its own firmware 56. It will be appreciated that the present disclosure is not limited to use with only one type of target device, and virtually any target device capable of transmitting/receiving text information via a serial connection to the serial appliance 14 may be used with the system 10.

A principal feature of the system 10 is the pattern matching application 32*a* which, in this first embodiment being discussed, runs in the HTML5 serial viewer application 30 on the client computer 12. This implementation is unique because it enables pattern recognition "per serial session". By "per serial session" it is meant that one user with an active serial session to a specific serial device, being carried out via the client computer 12, is not affected by another user working on a different client computer, who is carrying out a separate active serial session. This is because the pattern recognition application 32*a* is running on the client computer 12 in the HTML5 serial viewer application 30, and therefore only has access to the serial data stream from that particular active serial session being carried out by the client computer 12. The HTML5 serial viewer application 30 thus forms the conduit for user input by which the user can enter a predetermined character string. The user defined character string may take a number of forms, for example, a keyword or phrase of just letters, or an alphanumeric character string with at least some letters and some numbers, or a string of numbers only, or any of the above having one or more additional common symbols (e.g., "#", "$", "%", "/", "*", etc.), or possibly a string of symbols only, available from the user's keyboard 26.

During an active serial session, the pattern matching application 32*a* searches the HTML5 viewer screen buffer, which is a buffer associated with the HTML5 serial viewer application 30, and which contains the most recent screen data (e.g., the last 2000 lines of screen data). By this capability, the pattern matching application 32 searches for and detects the occurrence of the user defined predetermined character string within the HTML5 viewer screen buffer, as well as tracks the number of detected occurrences of the string within the HTML5 screen buffer. This monitoring and detection operation is performed in real time, so any detected occurrence of the user defined character string can be immediately recorded and/or used to initiate a follow-up notification action, as will be discussed more fully in the following paragraphs.

Figure 2:
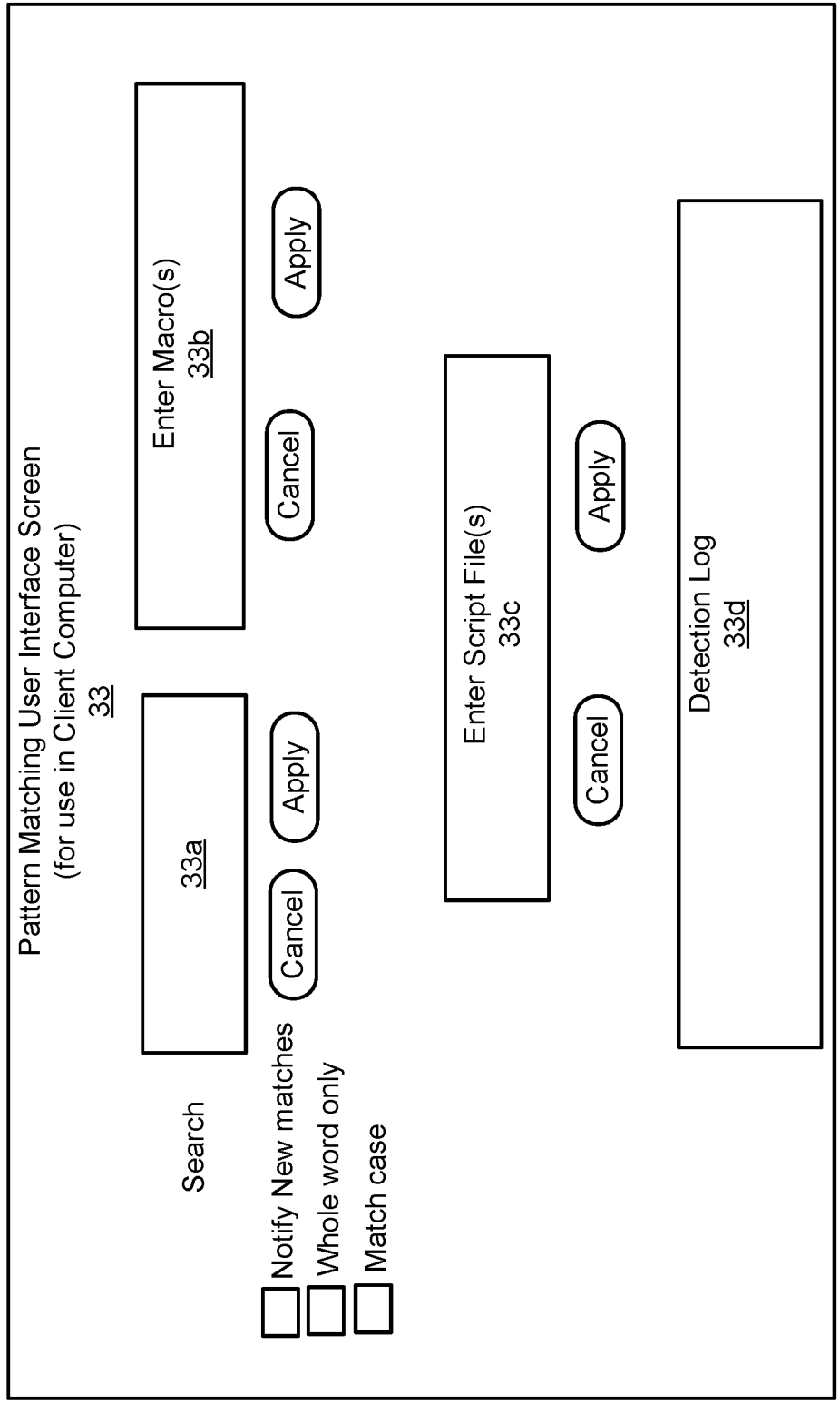
FIG. 2 is a high level block diagram representation of an interface screen that may be incorporated into the pattern matching application to enable a user to enter a specific character string to be searched for, as well as to enter macros, and also to provide a detection log file that the user can view, and further to allow the user to define follow-up actions to be taken upon the detection of the user defined character string.

One embodiment of the user interface 33 of the pattern matching application 32 is shown in FIG. 2. Again, this embodiment shown in FIG. 2 is used with the first embodiment of the system 10 where the pattern matching logic is included in the client computer 12. The user interface 33 enables the user to input a user defined character string in a first field 33*a* being displayed on the display 24 of the client computer 12. The user interface 33 also enables one or more user-defined macros to be input into a second field 33*b*. The user-defined macros will be triggered on each detected character string occurrence. The macros can be singular serial commands or a group of successive commands that are automatically executed by the pattern matching application 32*a* just as if the user had manually typed the commands into the pattern matching application 32*a*. The user interface 33 also may include a field 33*c* where a user can input a script file to be executed on each detected pattern occurrence for more sophisticated and complex actions than macros can offer. A detection log 33*d* displays data (e.g., a time stamp) associated with each detected occurrence of the user defined character string. The detection log may be updated in real time each time the user defined character string is detected.

Figure 3:
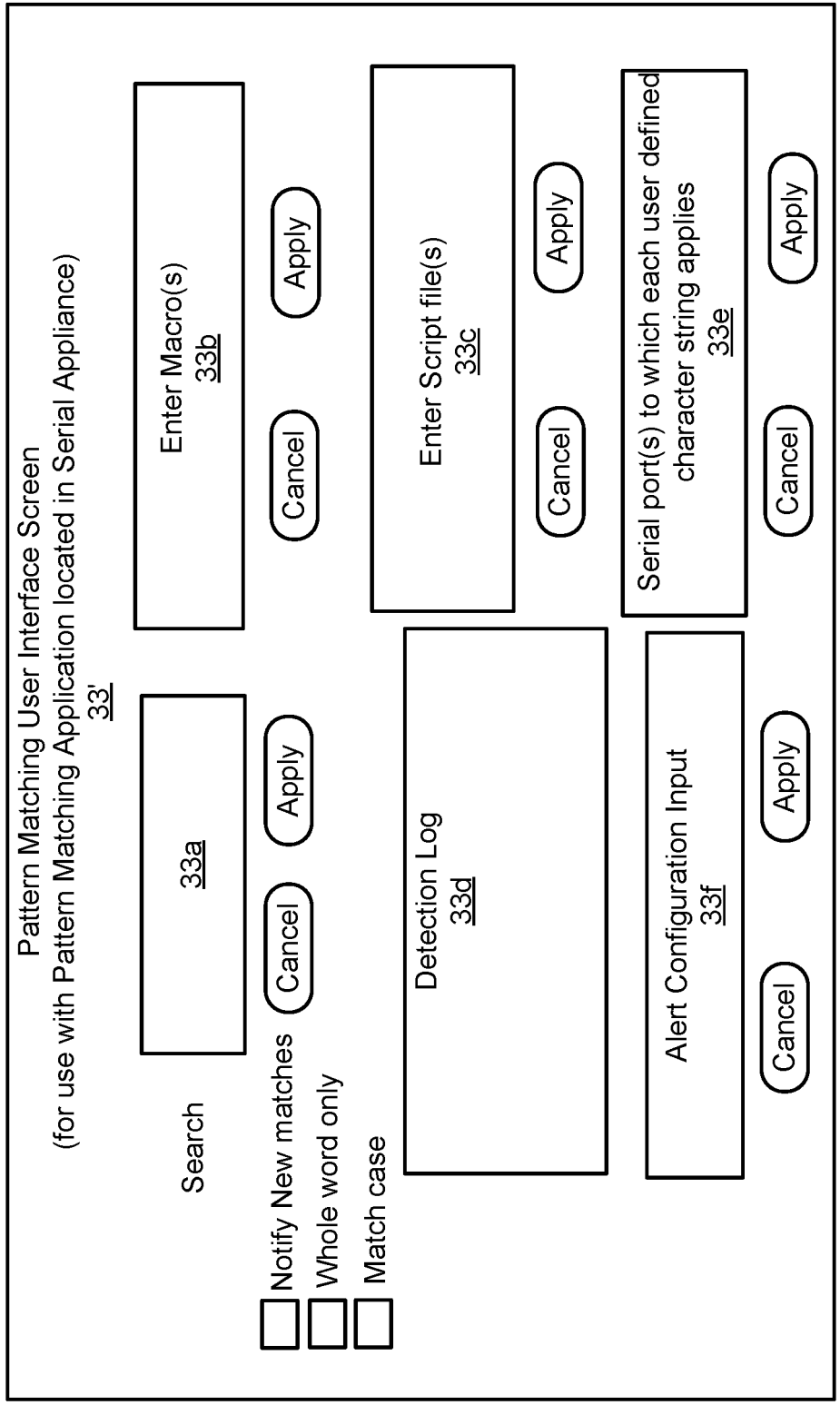
FIG. 3 is a high level block diagram of another embodiment of the interface screen which is well adapted for use with the system when the serial appliance includes the pattern matching application, and which illustrates additional fields for enabling the user to configure the specific serial ports of the serial appliance that are to be monitored, as well as how alerts will be provided when a detection of the user defined character string occurs.

Referring again to FIG. 1, the system 10 may be configured to form a second embodiment by including another instance of the pattern matching application, which is labelled 32*b*, in the memory 38 of the serial appliance 14. In this second embodiment, no pattern matching application is included in the client computer 12. When the pattern matching application 32*b* is located in the serial appliance 14, it is independent of any particular active user session. A user defined character string could also be programmed directly into the firmware 40 of the serial appliance 14. Detected occurrences of the user defined character string may be saved in a user accessible internal audit or event log (not shown) within the memory 38 of the serial appliance 14. Optionally, the detected occurrences could be exported to some other device including, but not limited to, the client computer 12 and/or an external log server. This second embodiment may also include a feature where the user may specify that the user defined character string should be applied to serial data received on every single serial port of the serial appliance 14 (which typically will have more than one serial port available, and more typically 2, 4, 8, 16 or 32 independent serial ports), or only on one or more specified ones of the available serial ports on the serial appliance. This optional feature may be implemented through an additional field, such as field 33*e* shown in another embodiment of the pattern matching user interface illustrated in FIG. 3 and labelled 33'. The field 33*e* shown in the user interface 33' in FIG. 3 enables the user to specify which specific serial port(s) of the serial appliance 14 is/are to be monitored for which specific user defined character string(s). This enables the user to define a character string that is to be detected in any serial data stream directed to any downstream port. Furthermore, a log entry may be created and/or displayed in the detection log 33*d* for each detected occurrence of any one or more of the user defined character strings which indicates the serial port(s) of the serial appliance 14 that the character string was detected on. Still further, the pattern matching user interface 33' shown in FIG. 3 may also include an "Alert Configuration Input" field 33*f* which enables the user to define how an alert should be provided, for example via an email to a specific email address, a text message to a specific smartphone number, etc.

In any of the above described scenarios where the user defined character string is detected, the notification (e.g., email message or text message) could be automatically generated to alert an IT administrator of the situation. Still further, as discussed above, a script file input via field 33*c* on either the interface 33 or the interface 33' could be executed on each detected pattern occurrence for even more sophisticated and complex actions than macros can provide. This would provide an opportunity to leverage open source software packages specifically designed for automation.

The actual character/text comparison algorithms used in the pattern matching application 32*a* or 32*b* may leverage existing APIs (application programming interfaces) or open-source packages for the character pattern detection analysis and detection. These may be Javascript APIs and libraries in the case of the HTML5 serial viewer application 30 or C/C++ APIs and libraries stored in the memory 38 of the serial appliance 14. User configurable options may also be specified to further define the pattern recognition logic, for example and without limitations, matching text case or whole word/string only. Still further, the pattern recognition feature of the pattern matching application 32a or 32b may be configured to require a specific privilege level to configure to enhance security.

The system 10 shown in FIG. 1 could also be configured to implement a third embodiment in which both pattern matching applications 32a and 32b are used simultaneously to detect the occurrence(s) of two or more user defined character strings. For example, the pattern matching application 32a could be included to search for first and second user defined character strings that are received by the client computer 12, while the pattern matching application 32b running on the serial appliance 14 is used to search for a third user defined character string that has been programmed into its memory 38 (e.g., into its firmware 40). Any occurrences of the third user defined character on any serial data stream being transmitted to any target device(s) (or any configurable subset of the connected target devices), may then be detected, regardless if the client computer 14 had the pattern matching application 32a running on it. As one example, User A may connect to the serial appliance 14 using an SSH client application from his/her client computer 12 to connect to serial port 1 (connected to target device 48) on the serial appliance. User A is not using the HTML5 serial viewer application 30, and therefore there is no pattern matching application on the client computer 12. User A configures the serial appliance 14 to execute script 1 on detection of a third user defined string (e.g., "thirdstring"). This third user defined string (stored on the serial appliance 14, which can be different than either of the first two user defined strings) can still be detected using the pattern matching application 32b on the serial appliance 14. So if User A types "thirdstring" in his/her SSH client application to send to target device 48, then script 1 will be executed automatically. Now consider that User B connects to the serial appliance 14 using the HTML5 serial viewer application running on his/her client computer to connect to serial port 2 (connected to a different target device, e.g., "target device 2") on the serial appliance 14. User B then configures the HTML5 serial viewer pattern matching application to execute macro 1 when "mystring" appears in the serial data stream. Now User B types "mystring" and "thirdstring" into the HTML5 serial viewer to send to target device 2. Both macro 1 AND script 1 will be executed in response to detecting these strings in the serial data stream. Macro 1 is executed in response to the pattern matching application running inside User B's HTML5 serial viewer application detecting "mystring." Likewise, script 1 is executed in response to the pattern matching application running on the serial appliance 14 that is monitoring ANY subset of serial ports on the serial appliance (in this case including port 2 to target device 2) detecting "thirdstring." Also, it is possible that the user defined character string could be saved on, for example, client computer 12, and provided to the serial appliance 14, while just the pattern matching application 32b is used for pattern detection, or vice versa. However, it is anticipated that it will be most efficient and most preferred to have the user defined character string saved on the same device that the pattern matching application 32a/32b is being used on.

It will also be appreciated that for many, if not most, applications, the primary interest will be in detecting the user defined character pattern in serial data being transmitted by the target device 48 and being received by the serial appliance 14. However, as noted above, the detection of the user defined character string is just as readily accomplished on serial data being transmitted from the serial appliance 14 to the target device 48. One possible real world example of where being able to detect the user defined character string in serial data being sent to the target device 48 would be useful would be in the characterization of certain actions. For example, tracking how often an IT administrative personnel had to reset a particular target device or apply some configuration would be quite helpful. Such information could help IT personnel determine the optimal configuration of a specific device, or possibly to identify which of two similar target devices has performed in a more stable manner over a given period of time (i.e., fewer required resets equals less down time). In these scenarios, the pattern to be found would come from the data the users supplied themselves.

It will also be appreciated that while the pattern searching capability of the system 10 can be applied to both serial input and output streams, as described above, there may be instances where this could be undesirable. For example, consider that in almost all cases where a serial terminal is used, the user input (i.e., from the serial appliance 14 to the target device 48) is usually echoed back to the sender—which is what makes the keyboard inputs that a user provides from his/her keyboard on a serial terminal visible on the serial terminal's display. The target device 48 receives the input stream (keystrokes), and converts them into characters and prints them. So in that moment, all of the input stream is echoed back from the target device 48 in its output stream to the serial appliance 14. The result is that a pattern search that is applied to the output data (i.e., data from the target device 48 to the serial appliance 14) usually covers the user's inputs as well, indirectly. However, in cases where user inputs are NOT directly echoed (made visible in the output), it might potentially be a security concern to scan and search the input. A good example is the input of a password on some Login screen. The password being entered is either echoed back to the output stream as, for example, characters, or not shown at all. Having this "invisible" input stream scanned for patterns would—in real life applications—most likely be seen as a security concern. In summary, although the example given in the above paragraph can be accomplished by applying the pattern matching to the input data stream (from the serial appliance 14 to the target device 48), in practical applications it would most likely be accomplished by scanning the output data stream (from the target device 48 to the serial appliance 14) that contains the input data stream echoed back to the serial appliance 14.

Figure 4:
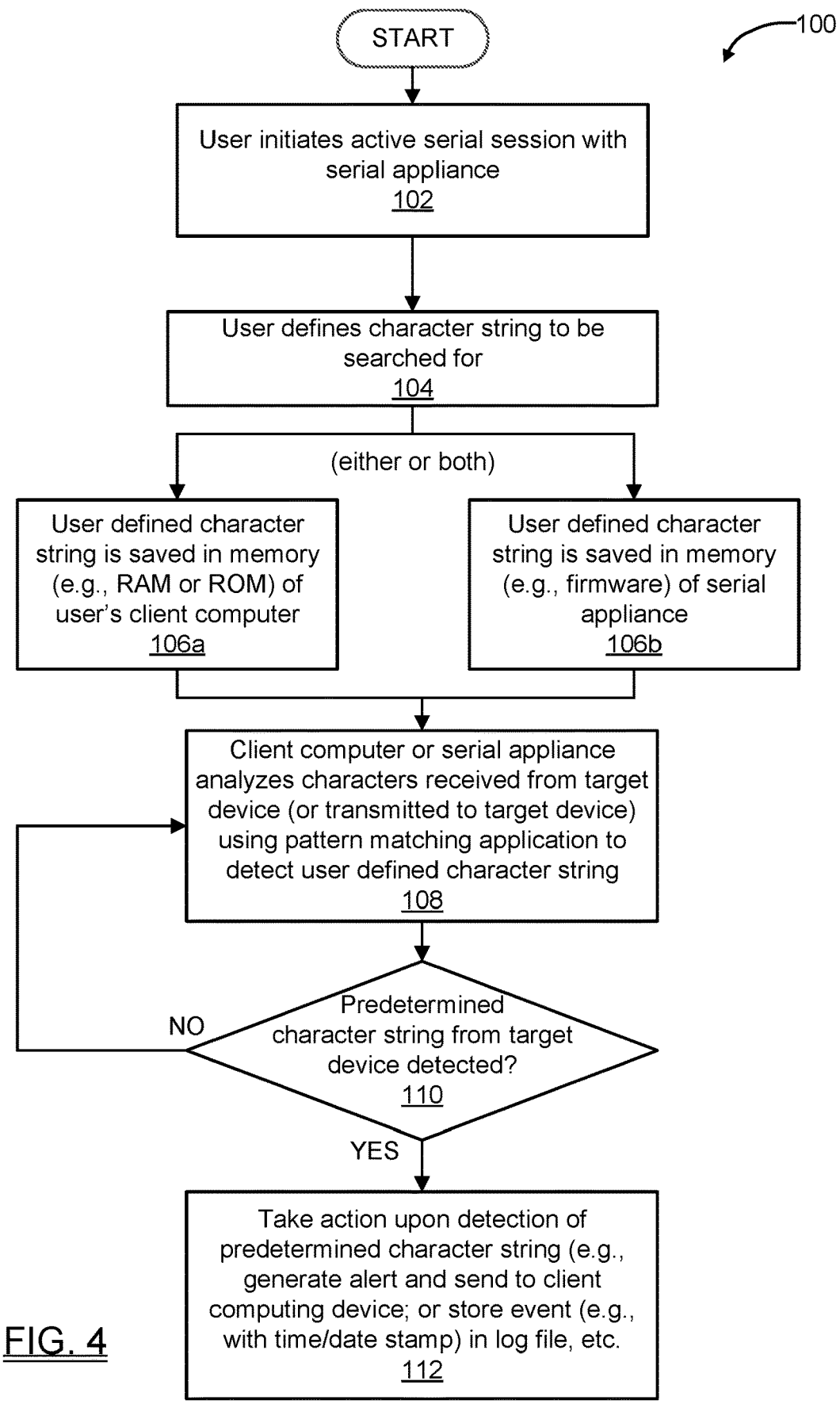
FIG. 4 is a high level flowchart of operations that may be performed by the system of FIG. 1 to detect and notify the user when a user-defined character string is detected in serial data being received by the serial-over-IP switch.

Referring to FIG. 4, a flowchart 100 is shown to illustrate various high level operations that may be performed using the system 10. At operation 102 the user initiates an active serial session with the serial appliance 14. At operation 104 the user defines the character string to be searched for in the serial data received from the serial appliance 14. The user defined character string is then saved in at least one (or possibly both) of the memory 22 of the client computer 12 or the memory 38 of the serial appliance 14, as called for in operations 106a and 106b. The client computer 12 or the serial appliance 14 analyzes characters received from the target device 48 (or transmitted to the target device 48) using the pattern matching application 32a or 32b to detect the occurrence of the user defined character string, as indicated at operation 108. At operation 110 the pattern matching application 32a or 32b makes a check to determine if the predetermined character string is present within a segment of data. The pattern matching application 32a or 32b may analyze the data one byte at a time, or alternatively may analyze multiple bytes at a time, depending on the implementation and the format of the input character string. If the character string is not detected, then operation 108 is repeated. If the check at operation 110 detects the occurrence of the user defined character string, then at operation 112 whatever subsequent action the user has set will be taken by the pattern matching application 32a or 32b, such as possibly generating an alert which is provided to the user's client computer 12, or storing the occurrence with a time/date stamp in an error log file or an audit log file either on the serial appliance 14 or on the user's client computer 12.

The system 10 and method of the present disclosure thus provide a means for detecting user defined character string patterns in serial data being received by a serial port of a serial appliance or being transmitted to the serial port of the serial appliance during an active serial session. The system 10 and method further enable important notification and/or follow-up actions to be taken upon the detection of a user defined character string. The system 10 and method further enable automation tasks to be carried out upon the detection of a user defined character string that would otherwise require installation of scripts or software on each target serial device, which in many instances would be highly undesirable or impractical in large modern day data centers with hundreds or even thousands of serial target devices. The system 10 may also be retrofitted into existing client computing devices and/or existing serial appliances through software and/or firmware modifications and does not require the addition of any new hardware components into either the client computing device or the serial appliance. The system 10 and method of the present disclosure also do not require any modification in the way a serial appliance is typically used to transfer serial data, or in how it, or the user's client computer, is connected to their respective networks.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system for detecting a user defined character string in serial data being at least one of transmitted to a target device or received from the target device, the system comprising:
   a computing device having a display and forming a serial communications device configured to enable a user to carry out a serial-over-IP active serial session with the target device, the serial communications device including:
   a serial viewer application running on the serial communications device for receiving and displaying serial data, the serial viewer application including a graphical user interface (GUI);
   a pattern matching application configured to at least one of run in the computing device, or to be controlled by a machine in communication with the computing device, or to use a machine that executes an externally called application programming interface (API), the pattern matching application configured:
  to receive a user defined character string entered via the graphical user interface;
  to monitor for an occurrence of the user defined character string in serial data being at least one of transmitted to the target device or received from the target device; and
  upon detection of the user defined character string in the serial data, to take a predetermined action specified by the user via the GUI or by the externally called API; and
  at least one of the GUI or the externally called API enabling inputting the user defined character string into a first field of the GUI displayed on the display of the computing device;
  the GUI or the externally called API enables enabling inputting a user defined macro into a second field simultaneously displayed on the display of the computing device, the user defined macro including at least one command that is automatically initiated upon detection of the user defined character string; and
  the pattern matching application further controlled to automatically generate a time stamp for each detection of the user defined character string; and
  the pattern matching application further updating a detection log, without user intervention, in real time, with each said time stamp associated with each said occurrence of the user defined character string.

2. The system of claim 1, wherein the predetermined action comprises at least one of:
  provide an alert of the detection, or
  record the occurrence of the detection, or
  automatically take an action to carry out a user predefined command or operation subsequent to the detection.

3. The system of claim 1, wherein the serial communications device comprises a client computing device.

4. The system of claim 3, wherein the client computing device comprises one of:
  a desktop computer;
  a laptop;
  a computing tablet; or
  a smartphone.

5. The system of claim 3, wherein the client computing device comprises a memory, and wherein the pattern matching application is stored in the memory.

6. The system of claim 1, wherein the serial communications device comprises a serial-over-IP serial appliance having a memory, and wherein the pattern matching application is stored in the memory.

7. The system of claim 6, wherein the serial-over-IP serial appliance comprises a plurality of serial ports available for use, and the pattern matching application is configured to enable the user to select which one of the plurality serial ports to use with the pattern matching application.

8. The system of claim 1, wherein the user defined character string comprises at least one of:
  a character string consisting of at least one letter;
  a character string consisting of at least one number;
  a character string consisting of both letters and numbers; or
  a character string consisting of at least one symbol.

9. The system of claim 1, wherein the serial viewer application comprises an HTML5 serial viewer running on the computing device.

10. A system for detecting a user defined character string in serial data being received by a serial-over-IP serial appliance, the system comprising:
  a computing device having a display, the computing device configured to enable a user to carry out an active serial session with the serial-over-IP serial appliance via a network connection with the serial-over-IP serial appliance, the computing device including:
    a memory;
    an HTML5 serial viewer application configured to reside in the memory and run on the computing device, the HTML5 serial viewer application including;
    a graphical user interface; and
    a pattern matching application stored in the memory and configured to run within the serial viewer application and to be displayed on the display of the computing device, the pattern matching application further being configured:
      to monitor for an occurrence of the user defined character string in serial data at least one of received by the serial-over-IP serial appliance from a target device, or transmitted from the serial-over-IP serial appliance to the target device, which said user defined character string is able to be presented in the HTML5 serial viewer application running on the computing device; and
      to at least one of:
        provide an alert of the occurrence of the user defined character string;
        record the occurrence of the user defined character string; or
        take an action to carry out a user defined command or operation upon the occurrence of the user defined character string; and
    the graphical user interface being configured for:
      enabling inputting the user defined character string into a first field displayed on the display of the computing device; and
      enabling inputting a user defined macro into a second field displayed on the display of the computing device, the user defined macro including at least one command that is automatically initiated upon detection of the user defined character string; and
    the pattern matching application further controlled to automatically generate a time stamp for each detection of the user defined character string; and
    the pattern matching application further updating a detection log, without user intervention, in real time, with each said time stamp associated with each said occurrence of the user defined character string.

11. The system of claim 10, wherein the user defined character string includes at least one letter.

12. The system of claim 10, wherein the user defined character string includes at least one number.

13. The system of claim 10, wherein the user defined character string includes at least one symbol.

14. The system of claim 10, wherein the occurrence of the user defined character string is recorded in a file on the computing device.

15. A method for detecting a user defined character string in serial data at least one of received from a target device during a serial-over-IP active serial session, or transmitted to the target device during the serial-over-IP active serial session, the method comprising:
  using a serial viewer application to:

to at least one of implement or communicate with a pattern matching application configured to monitor serial data at least one of received from the target device by a serial communications device, or transmitted to the target device from the serial communications device, during the serial-over-IP active serial session;

using the serial viewer application to implement a user interface, configured to be displayed on a display of a user computing device in communication with the serial communications device, the user interface enabling an input of a user defined character string into a first field of the user interface, and a user defined macro into a simultaneously displayed second field of the user interface, the macro configured to be executed automatically by the pattern matching application upon detection of the user defined character string;

comparing the user defined character string operably associated with the pattern matching application to serial data at least one of received by the serial communications device or transmitted from the serial communications device, to determine if the user defined character string is present in the serial data;

when the serial data at least one of received by the serial communications device, or transmitted from the serial communications device to the target device, is detected that matches the user defined character string, then automatically executing the user defined macro to take a predetermined action; and further using the pattern matching application to automatically generate a time stamp for each detection of the user defined character string; and further using the pattern matching application to update a detection log, without user intervention, in real time, with each said time stamp being associated with each said occurrence of the user defined character string.

16. The method of claim 15, wherein the taking a predetermined action comprises at least one of:

generating an alert of a detected occurrence of the user defined character string in the serial data;

recording a detected occurrence of the user defined character string in the serial data; or performing a user predefined command or operation upon a detected occurrence of the user defined character string.

17. The method of claim 15, wherein the using a pattern matching application to monitor serial data comprises using a pattern matching application stored in a memory of the user computing device which a user is using to carry out the serial-over-IP active serial session.

18. The method of claim 15, wherein the using a pattern matching application to monitor serial data comprises using a pattern matching operation stored in a memory of a serial-over-IP serial appliance that is being used to carry out the serial-over-IP active serial session.

* * * * *